Sept. 25, 1962 R. E. BRECKO ETAL 3,055,675
STEERING MECHANISM FOR TANDEM AXLE ASSEMBLY
Filed July 12, 1960 3 Sheets-Sheet 1
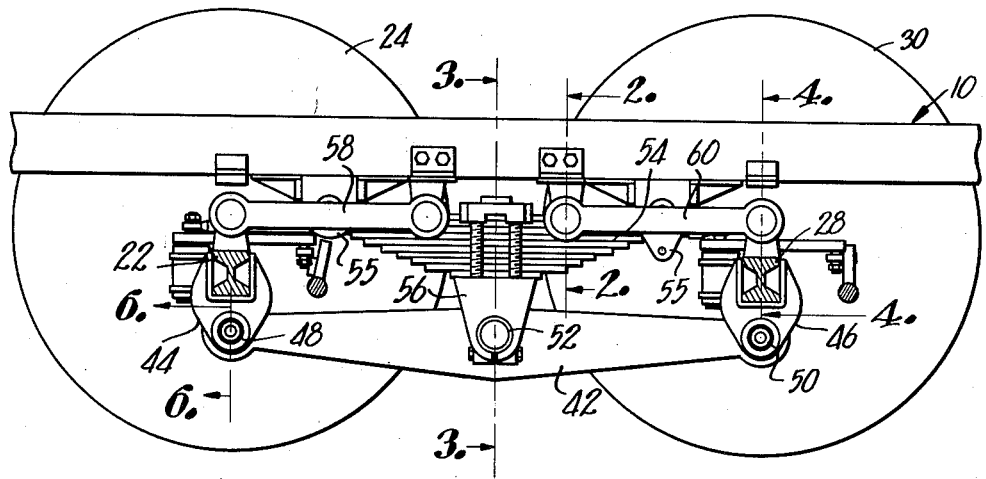
Fig. 1.
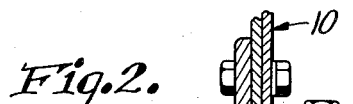
Fig. 2.
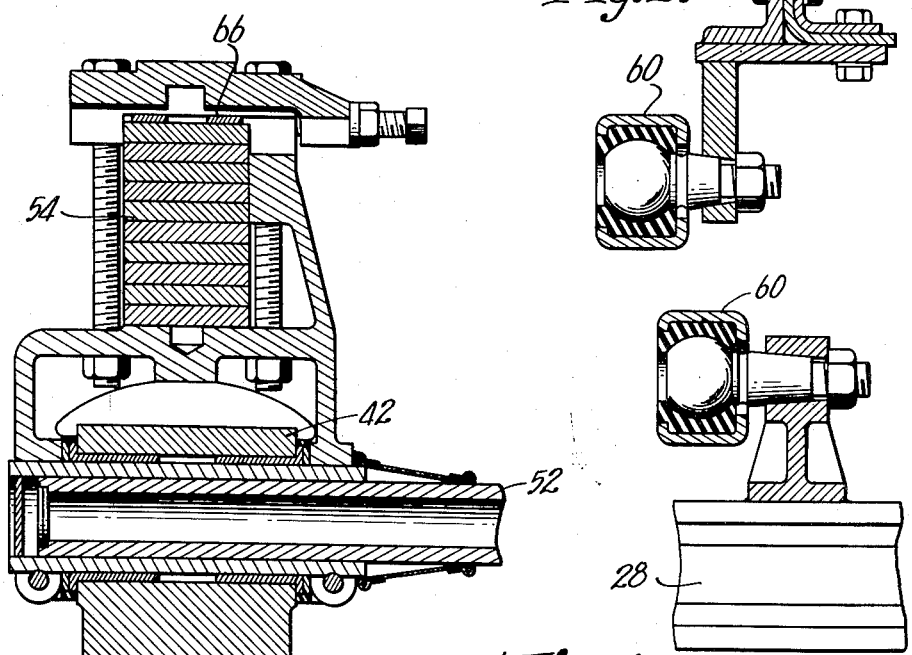
Fig. 3.
Fig. 4.
INVENTORS.
Darrel L. Bryan
BY Richard E. Brecko
ATTORNEYS.

Sept. 25, 1962 R. E. BRECKO ETAL 3,055,675
STEERING MECHANISM FOR TANDEM AXLE ASSEMBLY
Filed July 12, 1960 3 Sheets-Sheet 2

INVENTORS.
Darrel L. Bryan
BY Richard E. Brecko

ATTORNEYS.

Sept. 25, 1962   R. E. BRECKO ETAL   3,055,675
STEERING MECHANISM FOR TANDEM AXLE ASSEMBLY
Filed July 12, 1960   3 Sheets-Sheet 3

INVENTORS.
Darrel L. Bryan
BY Richard E. Brecko
ATTORNEYS

United States Patent Office 3,055,675
Patented Sept. 25, 1962

3,055,675
STEERING MECHANISM FOR TANDEM AXLE
ASSEMBLY
Richard E. Brecko, Kansas City, Mo., and Darrel L.
Bryan, Overland Park, Kans., assignors to Pacific Car
and Foundry Company, Renton, Wash., a corporation
of Washington
Filed July 12, 1960, Ser. No. 42,390
5 Claims. (Cl. 280—91)

This invention relates to improvements in road vehicles, and more particularly to undercarriages having at least one pair of wheel and axle assemblies arranged in tandem, the primary object being to provide a novel steering arrangement that is especially advantageous from the standpoint of reducing tire scuffage during turning and lessening the adverse effects of self-steering as the vehicle travels over uneven terrain.

It is the most important object of the instant invention to provide wheel and axle assemblies as aforesaid, wherein each wheel is independently steerable and the wheels are connected in pairs by tie rods, together with steering mechanism that operably interconnects the tie rods in a manner to cause the rods to move simultaneously when one is actuated, and to turn all of the wheels through preselected relative turning angles, whereby to reduce the tire scuffage as aforementioned by virtue of the fact that the wheels themselves travel through concentric circles during turning in either direction.

Another important object of the instant invention is the provision of steering mechanism that is properly associated with the spring supports and rocker arms of the undercarriage such that axle movement resulting from uneven terrain, will not impart a corresponding movement to the steering mechanism and particularly to a substantially centrally disposed connecting rod and thereby cause any appreciable steering in one direction or the other as the result of the rise and fall of one or more wheels.

In the drawings:

FIG. 1 is a fragmentary, vertical, cross-sectional view taken substantially on line 1—1 of FIG. 5, illustrating a tandem wheel and axle assembly embodying the steering mechanism of the instant invention.

FIG. 2 is an enlarged, fragmentary, detailed, cross-sectional view taken on line 2—2 of FIG. 1.

FIG. 3 is an enlarged, fragmentary, detailed, cross-sectional view taken on line 3—3 of FIG. 1.

FIG. 4 is an enlarged, detailed, fragmentary, cross-sectional view taken on line 4—4 of FIG. 1.

Figure 7:
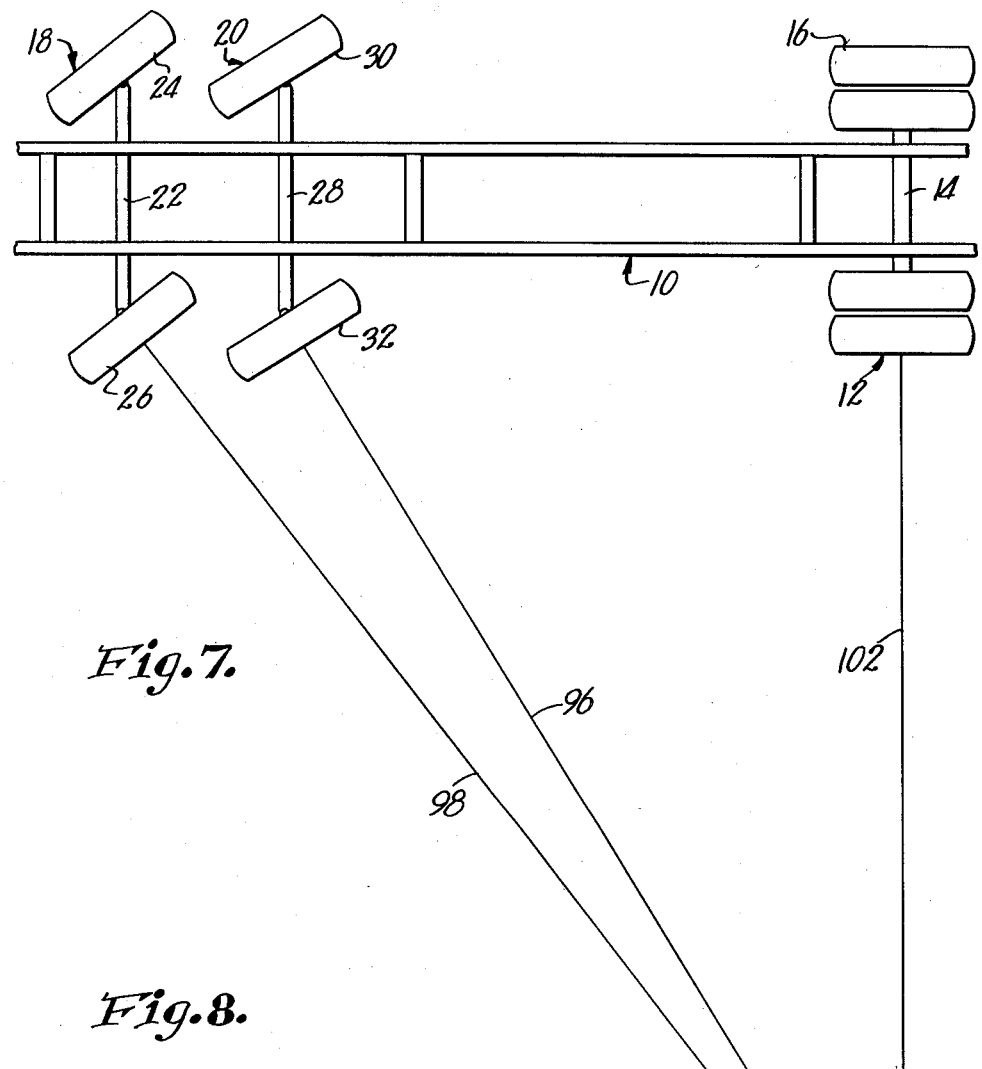
FIG. 7 is a diagrammatical view illustrating schematically a vehicle with which the undercarriage of the instant invention is adapted to be used and depicting the relative turning angles of the wheels in one direction.

FIGURE 7 of the drawings shows a vehicle frame broadly designated by the numeral 10, that is supported by a wheel and axle unit 12 which may include an axle 14 and wheels 16 that may be driven if desired, but are not adapted to be steered.

Frame 10 is also supported by a pair of wheel and axle assemblies broadly designated by the numerals 18 and 20, the former of which includes an axle 22 and a pair of wheels 24 and 26. Similarly, the assembly 20 has an axle 28 and a pair of wheels 30 and 32.

Figure 5:
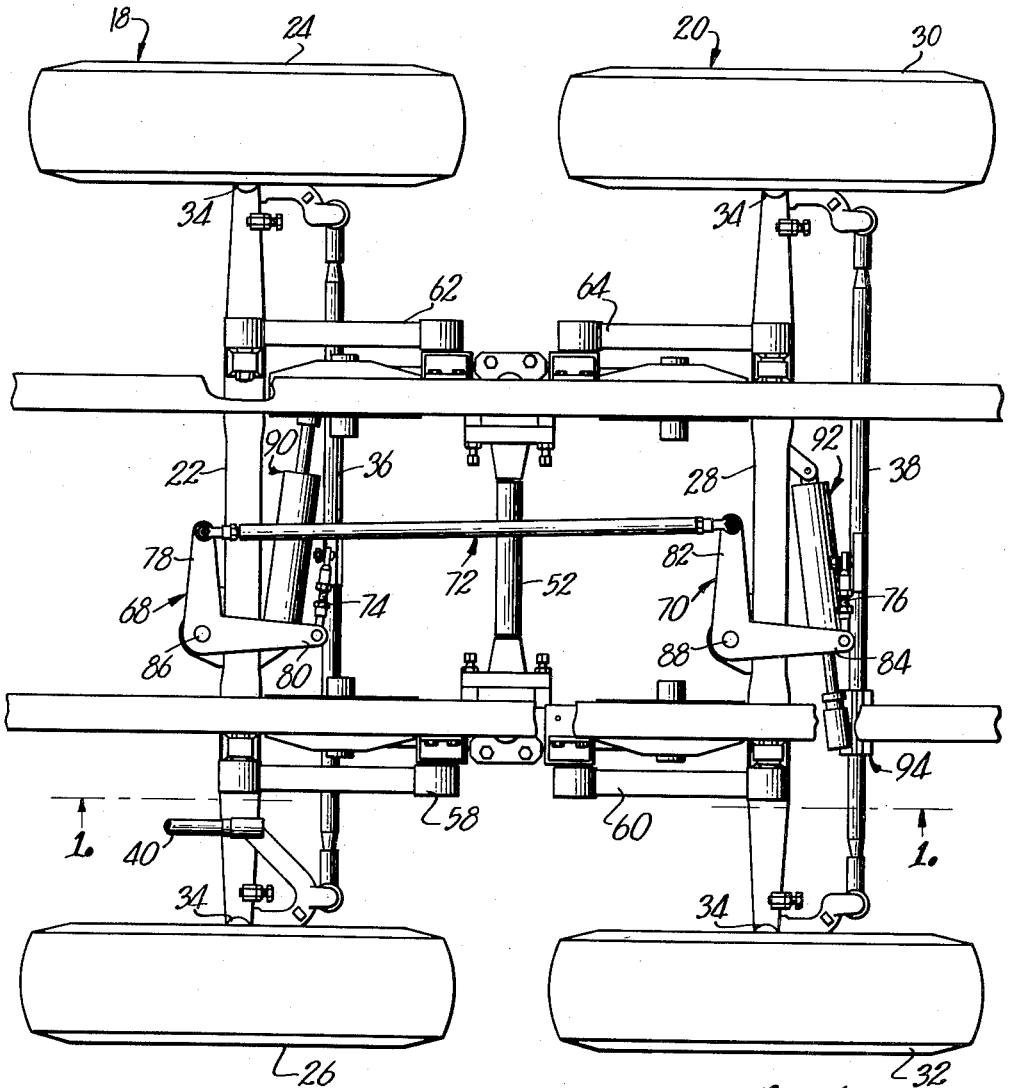
FIG. 5 is a top plan view of the undercarriage shown in FIG. 1, illustrated fragmentarily in connection with a vehicle frame which it supports, the frame being partially broken away for clearness.
Figure 6:
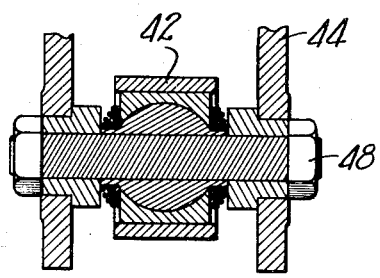
FIG. 6 is an enlarged, fragmentary, detailed, cross-sectional view taken on line 6—6 of FIG. 1.

The four wheels 24, 26, 30 and 32 are all steerable in any conventional manner, i.e., swingable about vertical axes 34, but since such means of connecting the wheels with the axles 22 and 28 form no part of the instant invention, details of construction thereof have not been illustrated. It is but necessary to point out that, as best seen in FIG. 5, the wheels 24 and 26 are pivotally interconnected by an adjustable tie rod 36 so that wheels 24 and 26 turn in either direction simultaneously when reciprocable force is imparted to the tie rod 36. A similar tie rod interconnection 38 is provided between the wheels 30 and 32.

There is also illustrated in FIG. 5, a drag link 40 operably coupled with the tie rod 36 so that the latter is shifted laterally whenever the steering mechanism of the vehicle is actuated to operate the drag link 40.

The axles 22 and 28 are interconnected by a pair of equalizer beams, the beam next adjacent the wheels 26 and 32 being illustrated in FIG. 1 and designated by the numeral 42. Saddles 44 and 46 suitably attached to axles 22 and 28 respectively, are coupled with adjacent ends of the beam 42 by pivot pins 48 and 50 respectively. A pivot tube 52 is common to the two equalizer beams and extends transversely of the frame 10 in the manner illustrated by FIG. 5, substantially midway between the axles 22 and 28. A spring unit such as 54 shown in FIG. 1 is disposed above each equalizer beam respectively, the spring units being suspended from the frame 10 by suitable spring hangers such as 55.

Each spring unit is provided with a clamp structure 56 for attaching the same to the pivot tube 52 and it is clear from the foregoing that the equalizer beams are adapted to rock about the horizontal axis of the common tube 52. Torque rods 58 and 60 pivotally interconnect the axles 22 and 28 respectively with the frame 10, it being noted in FIGS. 1 and 5, that the rods 58 and 60 extend inwardly from the axles 22 and 28 toward each other and are equal in length. A similar pair of torque rods 62 and 64 are provided for the axles 22 and 28 respectively at the opposite side of the frame 10 (see FIG. 5).

Spring units 54 support the frame 10 at the ends of the units 54 in hangers 55 by wear plates 66, and against which plates 66 the upper leaf of the spring units 54 is adapted to slide fore and aft.

The steering mechanism of the instant invention is properly associated with the parts heretofore described for supporting the frame 10 by the assemblies 18 and 20 so as to accomplish the novel results hereinafter made clear. Such steering mechanism includes structure for operably interconnecting the rods 36 and 38 and embodies a pair of movable devices 68 and 70, having an element 72 pivotally interconnecting the same, and means 74 and 76 pivotally coupling the devices 68 and 70 with rods 36 and 38 respectively.

More particularly, the devices 68 and 70 are in the nature of substantially L-shaped cranks presenting therefore, a pair of arms 78 and 80 for the crank 68 and a pair of similar arms 82 and 84 for the crank 70. Cranks 68 and 70 are horizontally swingable by virtue of pivot pins 86 and 88, connecting the same with axles 22 and 28 respectively, it being noted that the fulcrum points 86 and 88 are at the juncture between the two arms of each crank respectively.

The element 72 is in the nature of an elongated connecting rod that pivotally joins the arms 78 and 82, whereas the interconnecting means 74 and 76 each take the form of extensible linkage, permitting fine adjustment as may be needed or desired.

It is apparent from the foregoing that upon actuation of the drag link 40 to shift the tie rod 36 and thereby turn the wheels 24 and 26, a similar turning movement is imparted to the wheels 30 and 32 as illustrated for example, in FIG. 7. This is by virtue of the fact that rod 36 swings the crank 68 through the coupling means 74 and which in turn shifts the connecting rod 72, thereby swinging the crank 70 and moving the rod 38 through the coupling means 76 between crank 70 and the tie rod 38.

If desired, a power assist for such steering action may be provided in the nature of piston and cylinder assemblies 90 and 92 respectively for the rods 36 and 38 respectively. It is to be noted that the cylinders of the assemblies 90 and 92 are pivotally connected to the axles 22 and 28 respectively, and that the piston stems of the assemblies 90 and 92 are connected to the corresponding tie rods 36 and 38 by suitable clamps, one of which is best illustrated in FIG. 5 and broadly designated by the numeral 94. Preferably, the assemblies 90 and 92 lie in opposite directions and hydraulic fluid is directed to the cylinders thereof in parallel. The cylinders of assemblies 90 and 92 are piped from the stem end of one to the head end of the other, whereby to provide equal displacement. Here again, however, the hydraulic system forms no part of the instant invention and has, therefore, not been illustrated in detail.

Through the structure above described, it is possible to obtain correct relative steering angles between the two assemblies 18 and 20 to the end that, during turning, the wheels of the assemblies 18 and 20 travel in concentric circles. Such relationship is depicted in FIG. 7 of the drawings, illustrating by radius lines 96 and 98 that the wheels 26 and 32 move in circles that are concentric with a common axis 100 and, in order to minimize the amount of tire scuff as much as possible, it is to be preferred that the axis 100 intersect a projected line 102 that extends laterally from the axle 14.

The same relative turning angle between assemblies 18 and 20 is attained by providing a greater length in the arm 82 of crank 70 than in the arm 78 of crank 68, assuming that the assembly 18 is forwardly of the assembly 20 in the normal forward travel of the vehicle.

It is to be pointed out at this juncture that the identity in the relative turning angles may be attained regardless of variance in the distance chosen between the axles 22 and 28 simply by varying the relative lengths of the arms 78 and 82.

Figure 8:
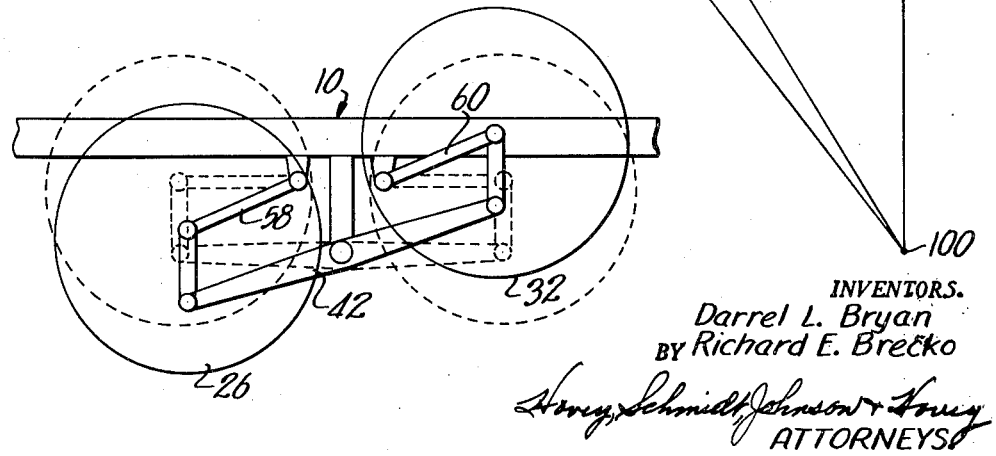
FIG. 8 is a diagrammatical view illustrating vertical movement of the wheel and axle assemblies by virtue of the rocking beams thereof.

As is well known in this field, one of the most difficult problems in undercarriages of the tandem axle type wherein each wheel is independently movable vertically by the structures shown in FIG. 1 for example, is avoidance of self steering as a consequence of uneven terrain. In other words, any one wheel 24, 26, 30 and 32 may either rise over protuberances in a roadway, or drop into depressions independently of the remaining wheels, as shown in FIG. 8 for example. In other words, if wheel 26 drops into a depression as shown by full lines in FIG. 8, its corresponding axle 22 will tilt downwardly throughout its length and ordinarily affect steering mechanism connected therewith in such manner as to cause undesired turning of the wheels of the undercarriage in one direction or the other. The same results are experienced in conventional structures when one or more wheels rise above the normal level of the roadbed, and in some structures, self-steering occurs when both wheels 26 and 32 rise or fall for example, with respect to wheels 24 and 30. In the instant invention, on the other hand, it is to be noted that the connecting rod 72 is normally disposed substantially along the fore and aft longitudinal axis of the undercarriage, and substantially midway of the ends of the axles 22 and 28. Also, it is to be preferred that the length of the connecting rod 72 be substantially the same as the length of each of the equalizing beams 42.

Consequently, longitudinal tilting of the axles 22 and 28 transversely of the vehicle, will have little, if any, effect upon the connecting rod 72 insofar as movement thereof is concerned fore and aft. The extent of downward or upward movement of either axle 22 or 28 at the wheels thereof, does not result in substantial vertical movement in the cranks 68 or 70 and, therefore, in the connecting rod 72. Inasmuch as the axles 22 and 28 are held in parallelism at all times by virtue of the equalizer beams 42, and regardless of vertical movement of any of the four wheels of assemblies 18 and 20, the only possible fore and aft movement that can be imparted to the rod 72 is as the result of vertical tilting of the axles 22 and 28, and since the rod 72 is centrally disposed as aforementioned, little if any steering results from uneven terrain.

It is appreciated that vertical tilting of the axles 22 and 28 relatively, would appear to produce a longitudinal twist in the rod 72, but it is to be pointed out that there is sufficient looseness of fit between the various pivotal connections, between rod 72 and the cranks 68 and 70, as well as between the cranks 68 and 70 and the axles 22 and 28 that the small amount of tilt in the axles will have no adverse effect upon the rod 72.

Having thus described the invention what is claimed as new and desired to be secured by Letters Patent is:

1. In a vehicle, a frame; a pair of wheel and axle assemblies; a pair of equalizer beams pivotally interconnecting the axles of said assemblies; spring means between each beam and the frame supporting the latter; means intermediate the ends of the beams pivotally coupling the same with corresponding springs, each assembly being provided with a pair of steerable wheels having a tie rod interconnecting the same; a drag link coupled to one of said tie rods and acting directly thereupon to actuate the latter; and structure operably interconnecting said rods whereby, upon actuation of one of the rods, corresponding movement is imparted to the other rod to simultaneously turn all of the wheels through preselected relative turning angles, said structure including a device movably carried by each axle respectively, means coupling each device with a corresponding rod, and a connecting rod pivotally joining the devices, said connecting rod and said beams being of substantially equal lengths.

2. The invention of claim 1, said connecting rod being disposed substantially along the fore and aft longitudinal axis of the frame.

3. The invention of claim 2, said connecting rod being disposed substantially midway of the ends of the axles.

4. In a vehicle, a frame; a pair of wheel and axle assemblies; a pair of equalizer beams pivotally interconnecting the axles of said assemblies; spring means between each beam and the frame supporting the latter; means intermediate the ends of the beams pivotally coupling the same with corresponding springs, each assembly being provided with a pair of steerable wheels having a tie rod interconnecting the same; a drag link coupled to one of said tie rods and acting directly thereupon to actuate the latter; and structure operably interconnecting the rods whereby, upon actuation of one of the rods, corresponding movement is imparted to the other rod to simultaneously turn all of the wheels through preselected relative turning angles, said structure including a horizontally movable crank loosely mounted on each axle respectively, means coupling each crank with a corresponding tie rod, and a connecting rod joining the cranks, there being a loose fit between said connecting rod and said cranks, the connecting rod being disposed substantially along the fore and aft longitudinal axis of the frame and substantially midway of the ends of the axles whereby tilting of the axles will not cause any substantial movement of the connecting rod.

5. The invention as set forth in claim 4 wherein the connecting rod and said beams are substantially equal in length.

References Cited in the file of this patent

UNITED STATES PATENTS

| | | |
|---|---|---|
| 1,158,137 | Livingood | Oct. 26, 1915 |
| 1,709,741 | Romine | Apr. 16, 1929 |
| 2,323,669 | Murty et al. | July 6, 1943 |
| 2,599,043 | Bissell | June 3, 1952 |
| 2,901,264 | Hart | Aug. 25, 1959 |

FOREIGN PATENTS

| | | |
|---|---|---|
| 674,249 | Germany | Apr. 11, 1939 |